United States Patent [19]

Nace

[11] Patent Number: 4,904,710
[45] Date of Patent: Feb. 27, 1990

[54] GAMMA RADIATION RESISTANT CARBONATE POLYMER COMPOSITIONS

[75] Inventor: Vaughn M. Nace, Lake Jackson, Tex.

[73] Assignee: The Dow Chemical Company, Midland, Mich.

[21] Appl. No.: 793,502

[22] Filed: Oct. 31, 1985

[51] Int. Cl.$^4$ ............................. C08K 5/05; C08K 5/06
[52] U.S. Cl. ................................. 523/137; 522/163; 524/377; 524/378
[58] Field of Search ............ 524/111, 114, 377, 378, 524/56, 58, 376; 522/163, 21; 523/128, 137; 428/412

[56] References Cited

U.S. PATENT DOCUMENTS

| | | | |
|---|---|---|---|
| 3,069,386 | 12/1962 | Barclay | 528/196 |
| 3,108,977 | 10/1963 | Wolff | 524/56 |
| 3,112,292 | 11/1963 | Bottenbruch et al. | 528/196 |
| 3,150,066 | 9/1964 | Schnell et al. | 522/163 |
| 3,186,961 | 6/1965 | Sears | 524/114 |
| 3,206,420 | 9/1965 | Smart et al. | 524/376 |
| 3,254,047 | 5/1966 | Caldwell et al. | 528/196 |
| 3,370,056 | 2/1968 | Yotsuzuka et al. | 568/607 |
| 3,385,814 | 5/1968 | Falkai et al. | 524/378 |
| 3,713,921 | 1/1973 | Fleischer et al. | 522/163 |
| 3,850,863 | 11/1974 | Clendinning et al. | 523/128 |
| 4,146,658 | 3/1979 | Humphrey | 524/378 |
| 4,333,809 | 6/1982 | Schreckenberg et al. | 522/163 |
| 4,335,036 | 6/1982 | Fowell | 524/376 |
| 4,624,972 | 11/1986 | Nace | 523/136 |

FOREIGN PATENT DOCUMENTS 0152012  8/1985  European Pat. Off. .

Primary Examiner—Veronica P. Hoke
Attorney, Agent, or Firm—Benjamin G. Colley

[57] ABSTRACT

Carbonate polymer compositions are rendered gamma ray resistant by the incorporation of 500 to 50,000 ppm of one or more polyether polyols. Compared to the controls, the compositions of the invention have a reduced yellowing after exposure to cobalt 60 radiation.

18 Claims, No Drawings

GAMMA RADIATION RESISTANT CARBONATE POLYMER COMPOSITIONS

BACKGROUND OF THE INVENTION

This invention relates to a gamma radiation resistant carbonate polymer composition wherein the polycarbonate polymer is rendered radiation resistant by the incorporation of an effective amount of one or more polyether polyols or the alkyl ethers thereof.

There is a distinct need for polycarbonate moldings that are resistant to gamma radiation so that they can be sterilized without substantial loss of clarity and physical characteristics.

It is known that polyolefins can be rendered radiation resistant by the addition of benzhydrol, hydrocarbon oils, phthalic esters, and benzaldehyde acetals. See for example U.S. Pat. Nos. 4,431,497, 4,460,445; and 4,467,065.

It is also known that blends of polycarbonate resins and polyethylene terephthalate are resistant to gamma rays. Modern Plastics January 1984 page 104; Plastics World December 1983 pages 68 and 69.

SUMMARY OF THE INVENTION

The present invention is a carbonate polymer having improved gamma radiation stability due to the incorporation of one or more polyether polyols or the alkyl ethers thereof in an amount sufficient to improve the gamma radiation resistance.

In general, this effective amount has been found to be in the range from 500 to 50,000 parts per million. A preferred range is 2500 to 15,000 ppm and the most preferred range is 5000 to 10,000 ppm.

DETAILED DESCRIPTION OF THE INVENTION

The carbonate polymers employed in the present invention are advantageously aromatic carbonate polymers such as the trityl diols carbonates described in U.S. Pat. Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365, and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The polyether polyols used in this invention are well known from U.S. Pat. No. 3,370,056 which is incorporated by reference herein.

The monoalkyl ethers of the foregoing polyols are obtained using alkyl ethers of a polyol as the initiator for the alkylene oxides. The dialkyl ethers are made by capping the foregoing alkyl ethers with an alkyl chloride.

Usually, the polyether polyols are prepared by reacting one or more alkylene oxides such as ethylene oxide, propylene oxide or butylene oxide with one or more polyols such as glycols, triols, tetrols, pentols, sugars, and sugar alcohols. The addition polymers can be in the form of random, block, or homopolymer form. The method of preparation of these random or block copolymers is well known in the art.

A preferred polyether polyol is one having the formula

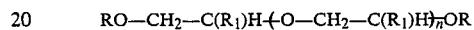

$$RO-CH_2-C(R_1)H\text{\textendash}(O-CH_2-C(R_1)H)_n\text{\textendash}OR$$

where
R is independently hydrogen or an alkyl group of 1 to 4 carbon atoms
$R_1$ is hydrogen, methyl or ethyl
n is a number having an average value of 1 to 1000.

The following examples are presented to further illustrate but not limit the invention.

EXAMPLES 1 AND 2

Three samples were prepared by adding various amounts of a polyethylene glycol (E-8000 sold by the Dow Chemical Company) to 2000 grams of polycarbonate resin pellets followed by agitation to disperse said additive. Each sample was then extruded and chopped on a 1.5 inch single-screw extruder. The resulting pellets were injection molded to yield test discs of 2 inch diameter by ⅛ inch thick. Each sample is listed below along with the corresponding amounts of added polyethylene glycol (PEG), beginning yellowness index, and final yellowness index after exposure to 3.0 Mrad of Cobalt-60 gamma radiation. ASTM Yellowness Index Test D-1925 was used to measure the relative yellowing between the sample containing the additive and the control. The results are shown in Table I where the percent reduction over the control resin is tabulated.

TABLE I

| SAMPLE | E-8000 (ppm) | YI INITIAL | YI FINAL | Δ YI | % REDUCT |
|---|---|---|---|---|---|
| Control 1 | 0 | 4.29 | 25.83 | 21.54 | |
| Ex. 1 | 5,000 | 3.49 | 16.85 | 13.36 | 37.9 |
| Ex. 2 | 10,000 | 3.49 | 14.09 | 10.60 | 50.8 |

EXAMPLES 3-8

The procedure of Example 1 was repeated with the various polyglycols set forth in Table II. The additives were used at the 10,000 parts per million level. The results are set forth in Table II.

TABLE II

| SAMPLE | ADDITIVE | YI INITIAL | YI FINAL | Δ YI | % REDUCT |
|---|---|---|---|---|---|
| Control 2 | None | 4.49 | 21.87 | 17.38 | |
| Ex. 3 | E-3350[1] | 4.21 | 17.44 | 13.23 | 23.9 |
| Ex. 4 | E-4500[1] | 4.25 | 15.51 | 11.26 | 35.2 |
| Ex. 5 | E-8000[1] | 3.22 | 14.02 | 10.80 | 37.8 |

TABLE II-continued

| SAMPLE | ADDITIVE | YI INITIAL | YI FINAL | Δ YI | % REDUCT |
|---|---|---|---|---|---|
| Ex. 6 | P-2000[2] | 3.25 | 11.10 | 7.85 | 54.8 |
| Ex. 7 | P-4000[2] | 12.52 | 18.61 | 6.09 | 64.9 |
| Ex. 8 | Voranol 5591[3] | 22.46 | 31.77 | 9.31 | 46.43 |

Notes:
[1] a polyethylene glycol from the Dow Chemical Company having the designated molecular weight.
[2] a polypropylene glycol from the Dow Chemical Company having the designated molecular weight.
[3] a glycerine initiated polypropylene glycol from the Dow Chemical Company.

EXAMPLE 9

The procedure of Example 1 was repeated using 3000 ppm of diethylene glycol dimethyl ether (diglyme) and 3.2 Mrad of gamma radiation. The results are set forth in Table III.

TABLE III

| SAMPLE | ADDITIVE | YI INITIAL | YI FINAL | Δ YI | % REDUCT |
|---|---|---|---|---|---|
| Control | None | 4.65 | 26.04 | 21.39 | |
| Ex. 9 | Diglyme | 3.86 | 20.90 | 17.04 | 21.3 |

I claim:

1. A solid carbonate polymer composition with improved resistance to gamma radiation which comprises a carbonate polymer and 500 to 50,000 parts per million of one or more polyether polyols or the alkyl ethers thereof.

2. A carbonate composition as set forth in claim 1 wherein the amount of said compound is in the range from 2500 to 15,000 parts per million.

3. A carbonate composition as set forth in claim 1 wherein the amount of said compound is in the range from 5000 to 10,000 parts per million.

4. A solid carbonate polymer composition with improved resistance to gamma radiation which comprises a carbonate polymer and 500 to 50,000 parts per million of one or more polyether polyols and/or the alkyl ethers thereof derived from the reaction of one or more alkylene oxides with a member of the group consisting of glycols, triols, tetrols, pentols, sugars, and sugar alcohols.

5. A carbonate composition set forth in claim 4 wherein the amount of said compound is in the range from 2500 to 15,000 parts per million.

6. A carbonate composition as set forth in claim 4 wherein the amount of said compound is in the range from 5000 to 15,000 parts per million.

7. A solid carbonate polymer composition with improved resistance to gamma radiation which comprises a carbonate polymer and 500 to 50,000 parts per million of one or more polyether polyols having the formula $$RO-CH_2-C(R_1)H-[-O-CH_2-C(R_1)H-]_n-OR$$

where
R is independently hydrogen or an alkyl group of 1 to 4 carbon atoms,
$R_1$ is hydrogen, methyl or ethyl, and
n is a number having an average value of 1 to 1000.

8. A carbonate composition as set forth in claim 7 wherein the amount of said compound is in the range from 2500 to 15000 parts per million.

9. A carbonate composition as set forth in claim 7 wherein the amount of said compound is in the range from 5000 to 10,000 parts per million.

10. A solid carbonate polymer composition with improved resistance to gamma radiation which comprises a carbonate polymer and 500 to 50,000 parts per million of polypropylene glycol.

11. A carbonate composition as set forth in claim 10 wherein the amount of said glycol is in the range from 2500 to 15,000 parts per million.

12. A carbonate composition as set forth in claim 10 wherein the amount of said glycol is in the range from 5000 to 10,000 parts per million.

13. A process for the production of solid carbonate polymers having improved resistance to gamma radiation which comprises incorporating into said polymers 500 to 50,000 parts per million of one or more polyether polyols or the alkyl ethers thereof.

14. The process as set forth in claim 13 wherein said polyols are derived from the reaction of one or more alkylene oxides with a member of the group consisting of glycols, triols, tetrols, pentols, sugars, and sugar alcohols.

15. The process as set forth in claim 13 wherein the amount of said polyol is in the range from 2500 to 15,000 parts per million.

16. The process as set forth in claim 13 wherein the amount of said polyol is in the range from 5000 to 10,000 parts per million.

17. A process for the production of solid carbonate polymers having improved resistance to gamma radiation which comprises incorporating into said polymers 500 to 50,000 parts per million of one or more polyether polyols wherein said polyols have the formula $$RO-CH_2-C(R_1)H-[-O-CH_2-C(R_1)H-]_n-OR$$

where
R is independently hydrogen or an alkyl group of 1 to 4 carbon atoms,
$R_1$ is hydrogen, methyl or ethyl, and
n is a number having an average value of 1 to 1000.

18. A process as set forth in claim 17 which comprises incorporating into said polymers a polyol wherein said polyol is polypropylene glycol.

* * * * *